United States Patent [19]

Chou et al.

[11] Patent Number: 5,826,011
[45] Date of Patent: Oct. 20, 1998

[54] METHOD OF METERING AND PROTECTING COMPUTER SOFTWARE

[75] Inventors: Wayne W. Chou, Ridgefield; Joseph M. Kulinets; Laszlo Elteto, both of Stamford, all of Conn.

[73] Assignee: Rainbow Technologies, Inc., Irvine, Calif.

[21] Appl. No.: 636,338

[22] Filed: Apr. 23, 1996

Related U.S. Application Data

[63] Continuation-in-part of Ser. No. 578,830, Dec. 26, 1995, abandoned.

[51] Int. Cl.[6] ............................ G06F 13/00; G11B 23/28; H04K 1/00
[52] U.S. Cl. ................................. 395/186; 380/3; 380/25
[58] Field of Search ............................... 395/186, 187.01, 395/188.01; 380/3, 4, 25, 49; 340/825.34; 364/246.6, 246.9

[56] References Cited

U.S. PATENT DOCUMENTS

| | | | |
|---|---|---|---|
| 4,634,807 | 1/1987 | Chorley et al. | 178/22.08 |
| 5,182,770 | 1/1993 | Medveczky et al. | 380/4 |
| 5,222,134 | 6/1993 | Waite et al. | 380/4 |
| 5,386,369 | 1/1995 | Christiano | 364/464.01 |
| 5,568,552 | 10/1996 | Davis | 380/4 |
| 5,610,981 | 3/1997 | Mooney et al. | 380/25 |
| 5,612,682 | 3/1997 | DeLuca et al. | 340/825.34 |
| 5,630,057 | 5/1997 | Hait | 395/186 |

*Primary Examiner*—Robert W. Beausoliel, Jr.
*Assistant Examiner*—Norman M. Wright
*Attorney, Agent, or Firm*—Joseph Levinson; Mark P. Stone

[57] ABSTRACT

A method of protecting computer software on installation is provided by providing an installation media containing an installation program supplied to the user along with an hardware security electrical device (HSED). The HSED must be connected to the user's computer before the software from the installation media can be entered on the user's computer. The HSED contains a variety of secret installation data which is used to install a program to be protected. In general the secret installation data is checked to see if a specific HSED is present and if it contains information to enable the installation process for that particular piece of software to continue. The exact nature of the secret installation data will depend on the process used for protection. The HSED is also used in a method of metering the amount of computer service used such that payment can be made at the time of delivery of the HSED to the end user.

6 Claims, 12 Drawing Sheets

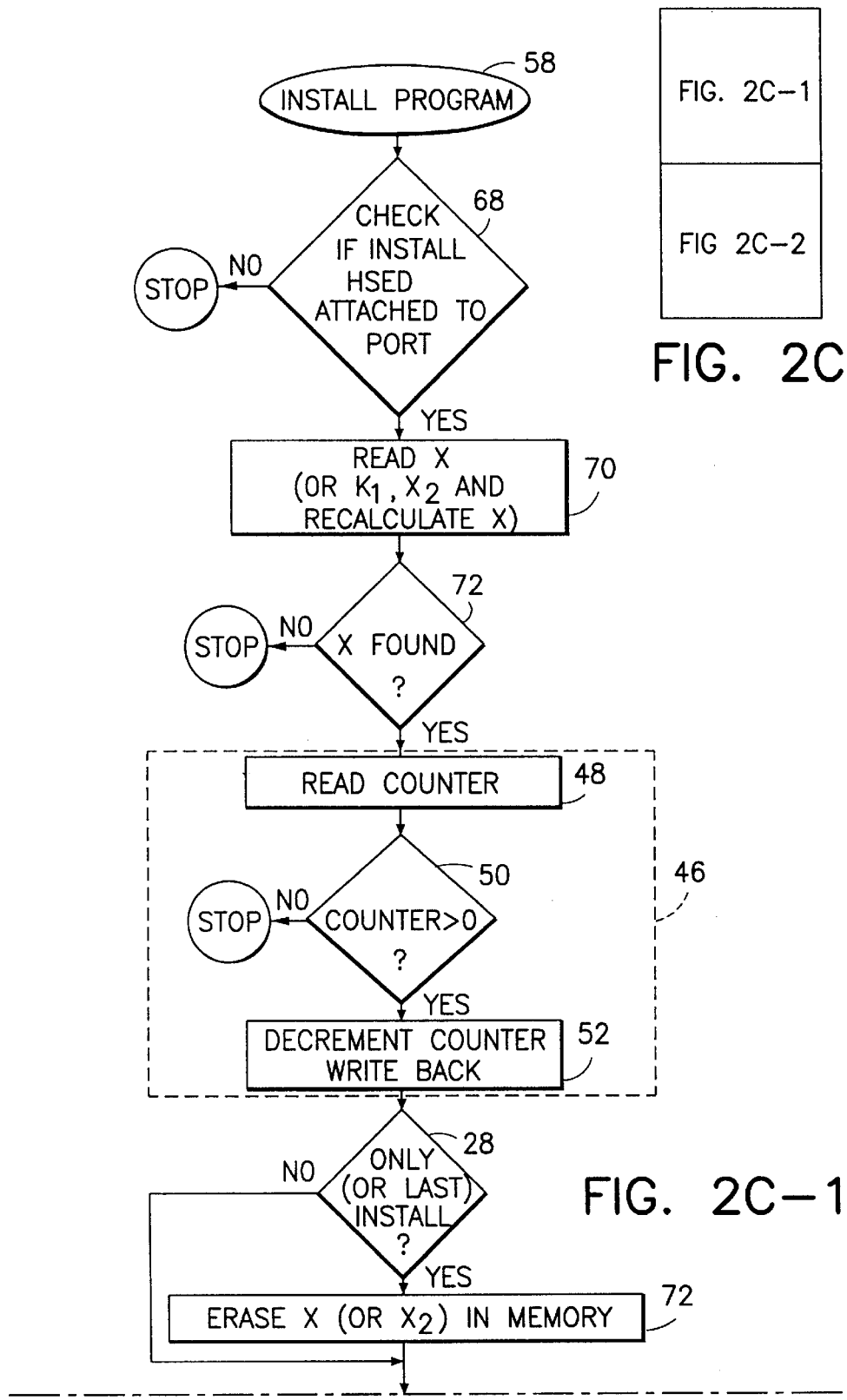

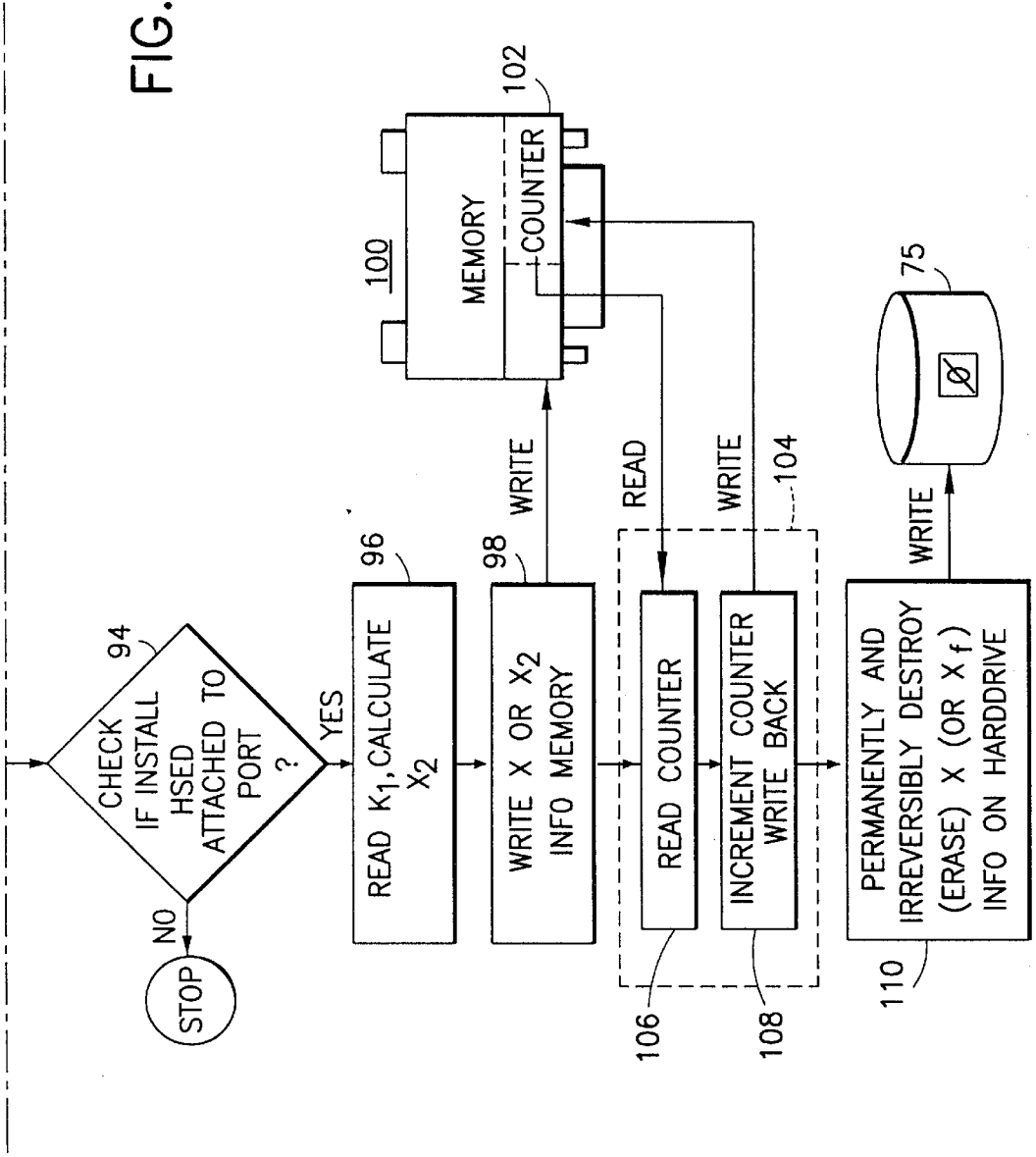

METHOD OF METERING AND PROTECTING COMPUTER SOFTWARE

This application is a continuation-in-part of application Ser. No. 08/578,830 filed Dec. 26, 1995, now abandoned.

BACKGROUND OF THE INVENTION

This invention relates to the protection of computer software, and more particularly, to the measuring, metering and/or dispensing of a predetermined amount of computer services using a plug-in hardware device and for providing basic protection for software during installation of a developer's program using the same type of external plug-in hardware security electrical device which is used for measuring, metering and/or dispensing computer services.

A hardware security electrical device such as a counter, a memory, a programmable and/or erasable device, etc. or a combination of such devices (hereinafter called a HSED) contains or generates certain secret data which has been used by program developers to protect their software. Generally, the execution control HSED is plugged into a port of the user's computer on which the developer's program has been installed. If the proper HSED has not been installed containing or generating the necessary secret data, the developer's program will not run on the user's computer, limiting the use of the developer's program to those who have the proper execution control HSED which are difficult to copy or reproduce.

The use of the execution control HSED has certain inherent drawbacks depending on the type of protection system involved. An execution HSED is required for each program and must remain plugged in the computer or be stored during non-use in one type of application. Modifications, upgrades or additional related programs require more execution HSEDs or the receipt of additional information from the developer to run the modifications, upgrades, or additions. Any protection system which requires additional contact between the developer and the user is time-consuming as well as costly. In addition, known execution control HSEDs have no means for measuring, metering or controlling the amount or number of times that the protected software is used.

SUMMARY OF THE INVENTION

Accordingly, it is an object of this invention to provide a new and improved method of using a computer plug-in device which measures, meters or dispenses a predetermined amount of computer services such as computer software in the form of games, programs, films, etc.

Another object of this invention is to provide a new and improved software protection method and system which, after the installation of the software to be protected, requires no further password, secret data, etc. or additional HSEDs to be delivered from the developer to the user and requires no execution HSED to be plugged in the computer port during execution of the software.

A further object to this invention is to provide a new and improved method of protecting software which limits the number of HSEDs required and/or limits the retention of a particular HSED, depending on the particular application.

Still another object of this invention is to provide a new and improved method and system of protecting software which is applied during installation to prevent the possibility of copying the software before or after the installation and executing such copied software on another computer.

Yet another object of this invention is to provide a new and improved method of computer software protection which is easy to apply, requires no complicated procedures on the part of the user, makes unauthorized copying meaningless and is less costly.

In carrying out this invention in one illustrative embodiment thereof, a method of protecting, measuring, monitoring and/or metering computer software using a computer plug-in hardware security electrical device (HSED) is provided comprising the steps of writing a predetermined amount of computer services which are paid for by an end user in the memory of the HSED, incorporating addressing data in the software involved in providing the predetermined computer services, thereby providing addressing software for the HSED, providing the addressing software and the HSED to the end user, running the addressing software to determine if the HSED is present and, if not, denying computer services, reading the contents of the memory in the HSED, reducing the amount of the computer services performed each time such computer services are used and denying computer performed services when the amount of computer services contained in memory are used up by the end user.

Various methods are provided using a similar approach to protect the software on installation and to prevent the possibility of repeating the installation of the software on another computer, or to prevent simply copying the files from one computer to another after its initial entry.

BRIEF DESCRIPTION OF THE DRAWINGS

The invention together with further objects, aspects, features and advantages thereof will be more clearly understood from the following description taken in connection with the accompanying drawings in which dashed enclosure steps are additional optional protective measures which may be elected by the user, and like steps are in some instances designated with the same reference numerals.

FIGS. 4A and 4B are flow diagrams illustrating how installed programs in accordance with FIGS. 3A and 3B can be uninstalled in accordance with the present invention;

DESCRIPTION OF THE PREFERRED EMBODIMENTS

Figure 1A:
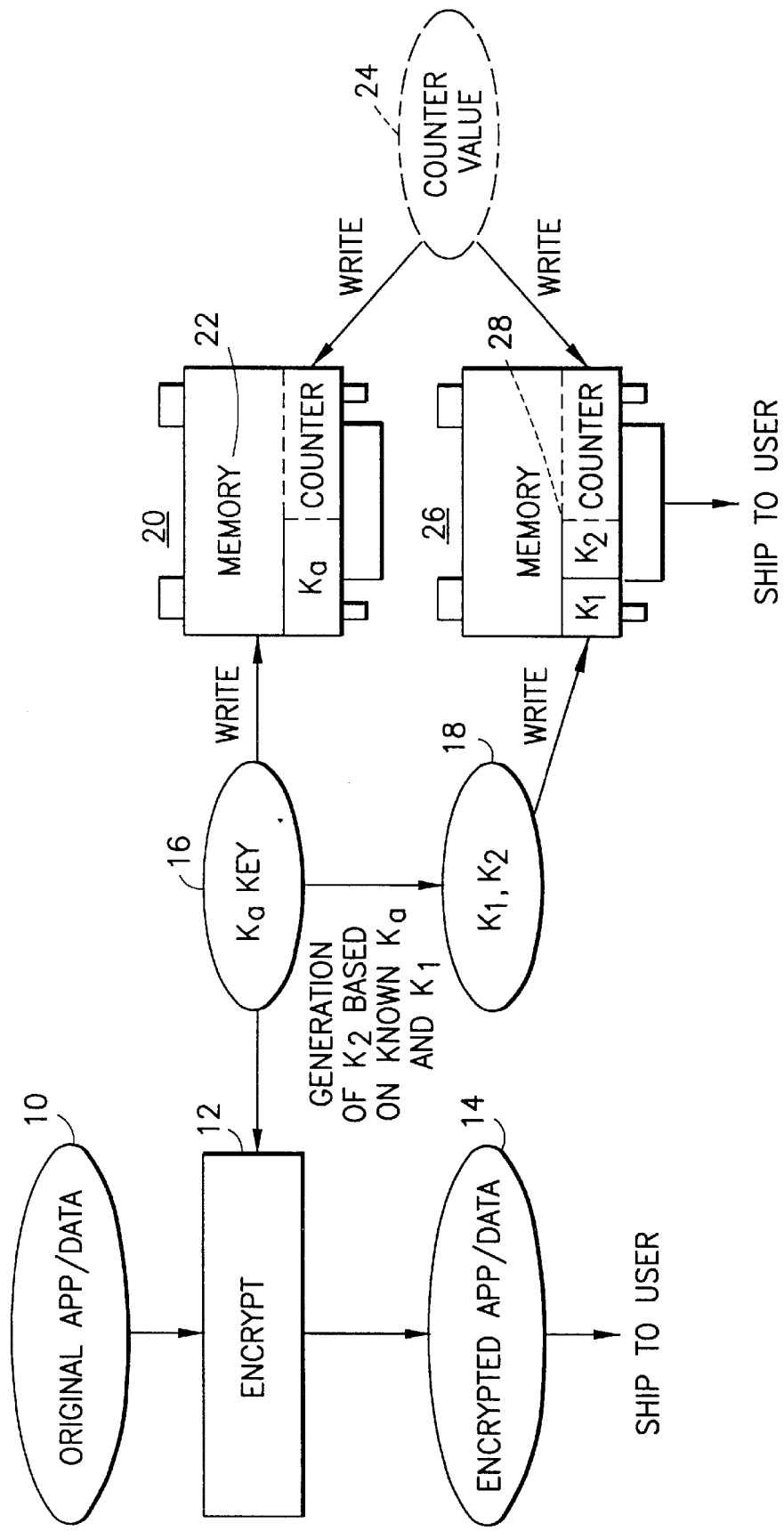
FIG. 1A is a flow diagram for the preparation of data for a decryption type application.

In the measuring, metering or monitoring application, the HSED is used with a predetermined count in memory which is decremented as the software is used or performed, as requested by the user. In the installation software protection application, the installation HSED in accordance with the present invention differs from the conventional execution control security device (execution HSED) in that it is used only during the process of the installation of the software in the computer. Since an installation media may be duplicated and the installation process repeated using the duplicate on another computer or simply copying the files after installation from one computer to another, the use of an installation HSED makes sense only when:

1. The software on the installation media is in encrypted form and must be deciphered prior to installation which deciphering is tied to the installation HSED. Also during installation some change must be made in the installed computer's files to make it impossible to move installed software from one computer to another or software to be installed is limited to a specific computer using its unique characteristics, e.g., fingerprint, or 2. The software to be installed is not encrypted, but during installation changes are made in the computer system's files such that simple copying and moving the installed software to another computer is difficult or the non-encrypted software is tied to a specific computer using its unique characteristics.

In either case 1 or 2 above, the installation HSED contains data which must be requested and checked to enable the installation process to proceed. The necessary data must be changed in the install HSED during the installation to prevent or limit the number of future installations of the program with that HSED.

The data derived from the information in the HSED should always be the same for a given program to be protected to simplify production of the program in which all the copies of the program are the same. For explanatory purposes, the data obtained with the HSED for program A is $K_a$. Accordingly, $K_a$ may be used as a deciphering key, i.e., a value to be matched, a unique constant in an algorithm to be used in the installation of a particular program, etc.

Some HSEDs permit data to be stored and retrieved, using e.g., electrically programmed read only memory (EPROM). Accordingly, a deciphering key $K_a$ can be stored in this type of HSED and erased after the first use. For a multiple program installation using one HSED, a multiplicity of such keys can be stored. If a multiplicity of programs in different combinations are to be provided, each program in combination is provided with a data bit which permits its installation.

In order to prevent the reproduction or recovery of the memory of the HSED or if all the HSEDs contain the same data, to distinguish one HSED from another, the HSED may be provided with unique characteristics, e.g., a permanent serial number assigned during manufacture. The serial number $K_1$ is written and locked in memory during manufacture, e.g., using an EEPROM. Other more secure HSEDs may be used having a unique serial number incorporated therein where $K_1$ is unalterable and non-reproducible, e.g., complex integrated circuits with $K_1$ incorporated in a ROM including Dallas Semiconductor Touch Buttons, Phone Card ICs, Smart Card ICs, etc.

Having an unalterable $K_1$, $K_a$ can be derived by combining $K_1$ with a derived $K_2$, e.g., $K_{2a}$ based on program A. A multiplicity of combinations using algorithms can be used to generate $K_a$ based on $K_1$ and $K_{2a}$. The requirements of the method are:

(1) generate $K_{2a}$ based on $K_a$ and $K_1$ and another secret value;

(2) restore $K_a$ based on known $K_1$ and $K_2$;

(3) no possibility of generating $K_{2a}$ for a given $K_1$ based on other known pairs $K_1$–$K_{2a}$ (known generation algorithm and known $K_a$).

The last requirement prevents the possibility of generating $K_{2a}$ for any $K_1$ based on analyzing the software to be installed because the secret value required for the generation of $K_{2a}$ never appears in the software supplied to the end user. Known methods of public-private key cryptography (RSA, El-Hamal, elliptic curves, LUC, etc.) answer the aforesaid requirements.

Several illustrative examples of HSEDs for use in the general description of the above principles of the install HSED follow. In a first example, the install HSED comprises an add-on EPROM which is connected to a port of the computer in which a program is to be installed. The HSED after manufacture has an empty memory containing all zeros (0) with the capability of writing ones (1) in the memory cells of the add-on EPROM.

In a one-time install only application, during the preparation of the HSED, the software developer writes the key $K_a$ or if split into $K_1$ and $K_2$ parts into a specified part of the memory by writing ones into the required bits. The installation proceeds as described hereinafter and after finishing of the installation, the installation program makes the key $K_a$ or $K_1$ and $K_2$ unusable by changing some of its bits (or the whole data containing the key) from zeroes to ones as illustrated below.

Before installation:

| $K_1$ | | | $K_2$ | | |
|---|---|---|---|---|---|
| 1 | 0 | 1 | 0 | 1 | 0 |

After installation:

| $K_1$ | | | $K_2$ | | |
|---|---|---|---|---|---|
| 1 | 1 | 1 | 1 | 1 | 1 |

In a many (N) copies install only application, the designated area in the memory is written with ones except for the last N bits that are left empty (zeroed). At the beginning of any installation the installation routine checks, if there are still zero bits at this designated area of the memory. The installation proceeds only if at least one such bit is found. At the end of installation a one is written into the still empty bit of the memory that was found previously. After N installations all empty bits at the designated area are filled with ones and the installation procedure will never go through, which is illustrated as follows:

Before installation:

| $K_1$ | | | $K_2$ | | | Mark area | | | | | |
|---|---|---|---|---|---|---|---|---|---|---|---|
| 1 | 0 | 1 | 0 | 1 | 0 | 1 | 1 | 0 | 0 | 0 | 0 |

After installation:

| $K_1$ | | | $K_2$ | | | Mark area | | | | | |
|---|---|---|---|---|---|---|---|---|---|---|---|
| 1 | 0 | 1 | 0 | 1 | 0 | 1 | 1 | 1 | 0 | 0 | 0 |

If there is a requirement for a many times install-deinstall copy of a program application, the designated memory area is divided into pairs of bits. A one is written into the first bit of the pair during the installation procedure and into the second bit of the pair during the deinstallation procedure. During the next installation procedure, a one is written into the first bit of the next empty pair and so on. The number of bit pairs initially determines the number of install-deinstall procedures permitted, which is illustrated as follows.

Before installation:

| $K_1$ | | | $K_2$ | | | Mark pair area | | | | | |
|---|---|---|---|---|---|---|---|---|---|---|---|
| 1 | 0 | 1 | 0 | 1 | 0 | 1 | 1 | 0 | 0 | 0 | 0 |

After installation:

| $K_1$ | | | $K_2$ | | | Mark pair area | | | | | |
|---|---|---|---|---|---|---|---|---|---|---|---|
| 1 | 0 | 1 | 0 | 1 | 0 | 1 | 1 | 1 | 0 | 0 | 0 |

After deinstallation:

| $K_1$ | | | $K_2$ | | | Mark pair area | | | | | |
|---|---|---|---|---|---|---|---|---|---|---|---|
| 1 | 0 | 1 | 0 | 1 | 0 | 1 | 1 | 1 | 1 | 0 | 0 |

In a many times install-deinstall of (N) copies of a program application, a similar procedure as above using three separate designated areas of an EPROM memory is used in which the first—to mark every install procedure with a one in the next empty bit, the second—to mark every deinstall procedure with a one in the next empty bit and the third area that contains the permitted total number of copies to be installed as a total number of empty bits in the area. The difference between the numbers of ones in the first and the second areas determines the number of program copies actually installed at the moment. The installation procedure stops if this difference exceeds the number of the zeroes in the third area, which is illustrated as follows:

Before installation (2 copies permitted):

| $K_1$ | | | $K_2$ | | | First-install area | | | | | |
|---|---|---|---|---|---|---|---|---|---|---|---|
| 1 | 0 | 1 | 0 | 1 | 0 | 1 | 1 | 0 | 0 | 0 | 0 |
| Second-deinstall area | | | | | | Third-Number area | | | | | |
| 1 | 1 | 0 | 0 | 0 | 0 | 1 | 1 | 1 | 1 | 0 | 0 |

After the first installation:

| $K_1$ | | | $K_2$ | | | First-install area | | | | | |
|---|---|---|---|---|---|---|---|---|---|---|---|
| 1 | 0 | 1 | 0 | 1 | 0 | 1 | 1 | 1 | 0 | 0 | 0 |
| Second-deinstall area | | | | | | Third-Number area | | | | | |
| 1 | 1 | 0 | 0 | 0 | 0 | 1 | 1 | 1 | 1 | 0 | 0 |

After the second installation:

| $K_1$ | | | $K_2$ | | | First-install area | | | | | |
|---|---|---|---|---|---|---|---|---|---|---|---|
| 1 | 0 | 1 | 0 | 1 | 0 | 1 | 1 | 1 | 0 | 0 | 0 |
| Second-deinstall area | | | | | | Third-Number area | | | | | |
| 1 | 1 | 0 | 0 | 0 | 0 | 1 | 1 | 1 | 1 | 0 | 0 |

After a deinstallation:

| $K_1$ | | | $K_2$ | | | First-install area | | | | | |
|---|---|---|---|---|---|---|---|---|---|---|---|
| 1 | 0 | 1 | 0 | 1 | 0 | 1 | 1 | 1 | 1 | 0 | 0 |
| Second-deinstall area | | | | | | Third-Number area | | | | | |
| 1 | 1 | 0 | 0 | 0 | 0 | 1 | 1 | 1 | 1 | 0 | 0 |

In an installation of many (M) programs with one HSED, it should be understood that by dividing the whole volume of the Add-on EPROM memory into M independent parts, the use of the mentioned above methods for M independent software programs from one or more developers can be employed. In the last case, each independent part of the memory should contain the developer and program IDs and each part contains the key $K_a$ ($K_b$, $K_c$, etc. for other programs) or the combination of key $K_1$ that could be common to HSED and keys $K_2$ for each program.

Another HSED example is a phone-card based HSED comprising a phone-card memory integrated circuit (IC) connected to the port of the computer. The simple phone card memory integrated circuit contains a counter that can be written-in only after a procedure that is a secret of the developer and is based on a non-volatile memory (EEPROM). The procedure of writing to the counter can be performed only by the developer. Each IC contains a unique serial number that can be used as $K_1$. Additionally, the developer writes into an unused part of the memory the key $K_2$ that, combined with the serial number of the IC, provides the key $K_a$ for permitting the program installation.

In a many (N) copies of one program install only, the number in the counter represents the permitted number of installations for that particular program. If only a one-time installation is permitted, the number is equal to 1. If N installations are permitted, the number is equal to N. Before each installation, the installing program checks the contents of the counter. If it is equal to zero, the installation procedure is prohibited; otherwise the installation proceeds. During the installation procedure using a special instruction to the HSED, the contents of the counter are decremented by 1.

In a many time install-deinstall of one copy of a program application, the initial state of the counter is equal to a maximum possible odd number. The installation procedure each time decrements the contents of the counter from an odd to an even state. The deinstallation procedure decrements the contents of the counter from an even to an odd state. At the beginning of installation, the procedure checks the state of the counter and proceeds with the installation if it is odd and stops if the contents of the counter is even.

In a one-time install of one copy of any of many different programs application, each program has a bit in the contents of the counter assigned to it. Before the installation of the particular program, a test is performed to determine if the bit P is still installed, where P is the position number of the bit assigned to that particular program. The larger numbers P should be assigned to more expensive programs. During the installation of the program, the contents of the counter are decremented $2^P$ times.

In another embodiment using the same idea, sequential prime numbers are assigned to different programs, each program having its own prime number. An initial number written into the counter is equal to the product of the prime numbers assigned to the programs to be installed. The larger numbers should be assigned to more expensive programs. Before the installation of a particular program, a test is performed to determine if the contents of the counter are divisible by the prime number assigned to that particular program. After installation of any program, the contents in the counter are changed by the sequence of a decrementing instruction to a new number that is equal to the quotient of the division of the old contents of the counter by the number assigned to the program just installed.

Another HSED example is an EEPROM based HSED comprising an EEPROM memory IC connected to the port of the computer. Part of the memory is closed for write into memory. During manufacture the developer writes the serial number of the device into that part of the memory and after that locks it for write operations. As described above, the serial number acts as a key $K_1$. The $K_2$ is written into another part of the memory and can be destroyed upon successful installation.

In a more complicated scenario as described above, the installation procedure could change the state of particular bit in the memory or increment a particular counter that is organized in the memory. The deinstallation procedure returns the same bit to the initial state or decrements the counter. All functional applications previously mentioned can be implemented.

In another HSED example using a ciphering procedure inside the HSED with hidden keys or unknown algorithms, the HSED comprises a ciphering/deciphering IC connected to a port of a computer.

The ciphering key $K_a$ is secret and can only be written, but never read outside the HSED. Being entered once, the ciphering key is stored inside the HSED. The IC regularly contains a memory for a few such keys plus a non-volatile memory for customer data.

In one implementation, during installation of the software, the HSED receives a particular ciphered string to be deciphered. The results of the deciphering are compared to known data. If the results match, the installation proceeds, otherwise stops. During the successful installation, the installation routine rewrites the deciphering key inside the HSED with garbage data, preventing the possibility of another installation.

In another implementation, the other data to be deciphered is stored in the user portion of the HSED's non-volatile memory and contains in ciphered form the permitted number of copies to be installed. This number is read from the memory of the HSED to the computer and sent back to the HSED for deciphering. If the result of the deciphering is a positive number, the installation proceeds, and the deciphered number is decremented by one and sent to the HSED for ciphering. The ciphered number goes back to the computer, and the computer writes it back into the memory in the HSED.

Reference is now made to the drawings which provide flow charts illustrating several examples of the use of the install HSED in accordance with this invention. FIG. 1A illustrates the preparation of software on an installation media which includes the original installation application and installation data in the form of an installation program represented by the reference numeral 10 which is fed to encrypt means 12. The encrypted software application and the installation data 14 in the form of the installation media is shipped to the user. In order to perform the encryption function, an encryption key $K_a$ 16 (where "$_a$" is a particular program $_a$ and $K_b$ would be used for program $_b$, etc.) is applied to the encrypt block 12. As an alternative, $K_a$ key 16 may be represented as a combination of two keys, $K_1$ and $K_2$ 18, where $K_1$ is a fixed unalterable value and when used would be combined with $K_2$ to obtain $K_a$. A HSED 20 having a memory 22 is prepared by writing $K_a$ in memory 22. As an optional feature, a counter value 24 may be used to write a number in the counter portion of the memory 22 which may be used to limit the number of installations of the installation media 10. If the alternate form is used in which $K_a$ is represented as $K_1$ and $K_2$, a HSED 26 having a memory 28 therein has $K_1$ and $K_2$ written into memory 28 along with the number of installations desired from optional counter 24. In either case the encryption 12 of the original application or data is performed using an encryption key 16 ($K_a$) Both the encrypted application and associated HSED 20 or 26 are shipped or otherwise provided to the user.

Figure 1B:
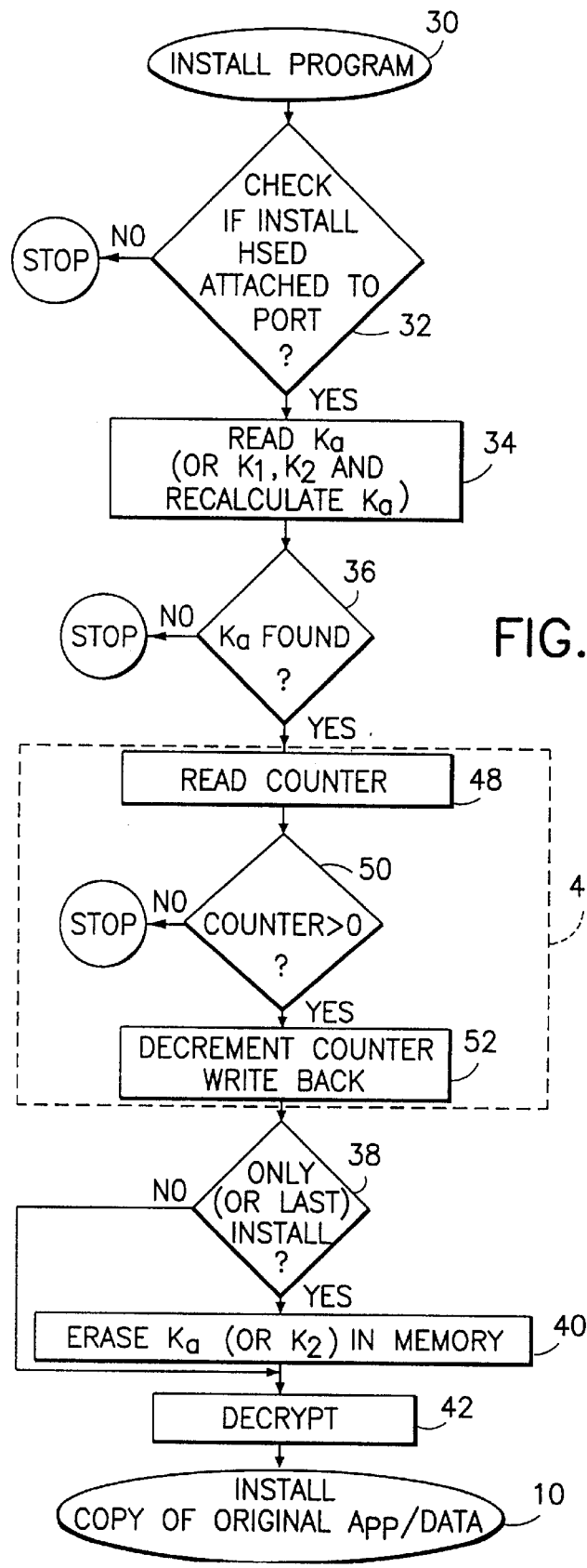
FIG. 1B is a flow diagram of the installation on the user's computer of the decryption type application illustrated in FIG. 1A.

The installation of the program at the user site is illustrated on FIG. 1B. The encrypted installation medium containing the encrypted application 14 is applied to the user's computer in the install program 30 step when checks to see if the install HSED 20 or 26 is attached to the computer port of the user's computer in step 32. If not, the program will not be installed. If yes, then $K_a$ is read from HSED 20 or $K_1$ and $K_2$ are read from HSED 26 and combined in a special algorithm to produce key 16 in step 34. If $K_a$ cannot be found in step 36, the installation will stop. If found, the only install or last install in step 38 is checked, and if yes, the information in the install HSED is immediately destroyed (erase $K_a$ in HSED 20 or erase $K_2$ in HSED 26) in step 40. The decrypt step 42 decrypts the original program onto the customer's computer's hard drive to provide a copy of the original program (Appl/Data) 10.

In the optional counter check step illustrated by the dashed enclosure (46 in FIG. 1B), a set number of installments of the program can be found in the counter section of memory 22 for HSED 20 or the counter section of memory 28 in HSED 26. If $K_a$ is found in step 36, the counter is read in step 48 and checked in 50 to see if the number in the counter is greater than 0, if not, the program is not installed. If yes, the counter is decremented in step 52 and the process continues as described above.

Figure 2B:
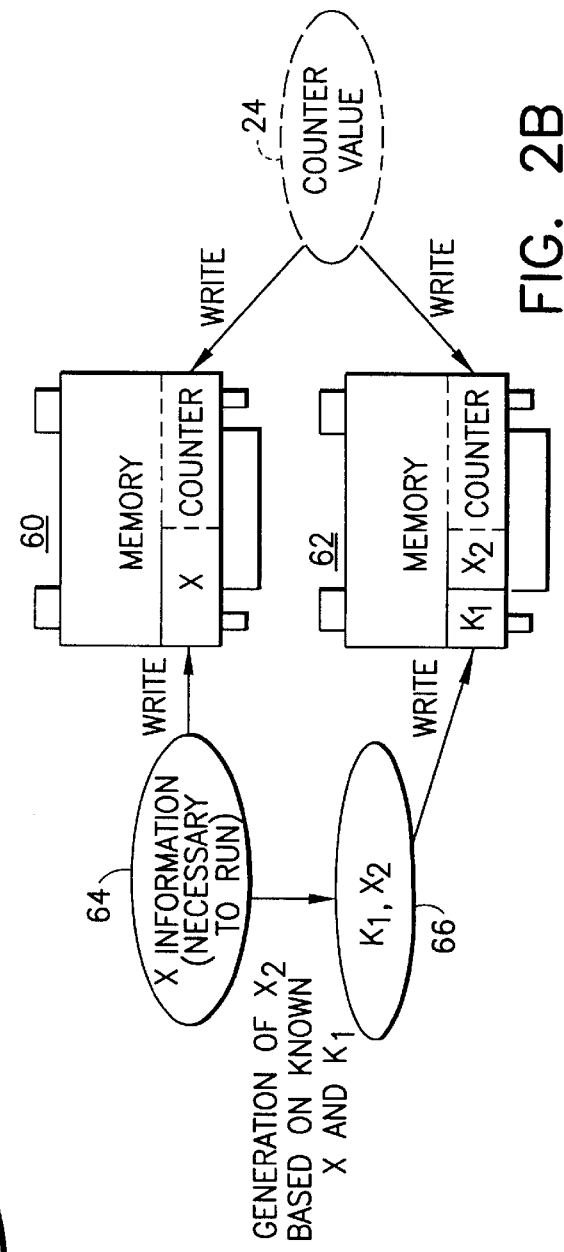
FIGS. 2A and B are flow diagrams for the preparation of a particular application requiring a specific piece of information X to install the program to be protected.
FIG. 2C (2C-1 and 2C-2) is a flow diagram for the installation of the application illustrated in FIGS. 2A and 2B.
Figure 2A:
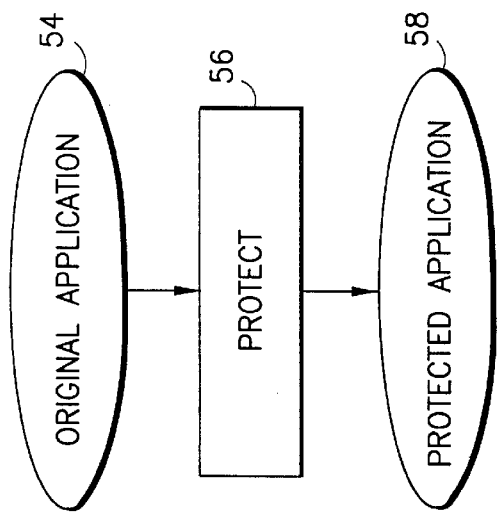

In preparation for a non-encrypted type application, illustrated in FIG. 2A, the original non-encrypted application or program 54 is protected with a protect step 56 such that a specific piece of information (X) is necessary to install the program 54 which results in a protected application or program 58. FIG. 2B shows the preparation of the install HSEDs 60 or 62 in which the X information is written in and stored in the memory of the HSED 60. If the X information 64 is represented as a combination of $K_1$ and $X_2$ 66 where $K_1$ is a fixed, unalterable value, $K_1$ and $X_2$ are stored in the memory of HSED 62. An optional counter value 24 may be included to write and store a permitted number of installations in memory of one of the HSEDs 60 or 62. The protected software 58 with the program and applicable install HSED either 60 or 62 are provided to the customer/user. At the installation site FIG. 2C-1, the user runs the install program 58 which at 68 checks for the presence of install HSED 60 or 62 as the case may be, and if not present, the process is stopped. If present, the HSED is read in step 70 to retrieve the secret information (X or reads $K_1$ and $X_2$ and combines them to get X). If X is not found in step 72, the installation stops. If found, the optional step 46 is followed if a counter 24 is used following the same procedure as set forth in the embodiment disclosed in FIG. 1B. If this is the last time program to be installed pursuant to a given count in step 28, the next step 72 immediately destroys the information in the install HSED (erasing X in HSED 60 or $X_2$ in HSED 62). As will be seen in FIG. 2C-2, X is stored onto the customer's hard drive 75 in step 74, preferably in a way that the stored format cannot be used on another computer. One method is to obtain the fingerprint $F_p$ of the computer 76 which is stored in the computer 76 in step 78. The fingerprint $F_p$ is combined with X to calculate $X_f$ in step 80 which is then stored a s shown in block 82 by writing in the hard drive 75.

Figures 2, 2C:
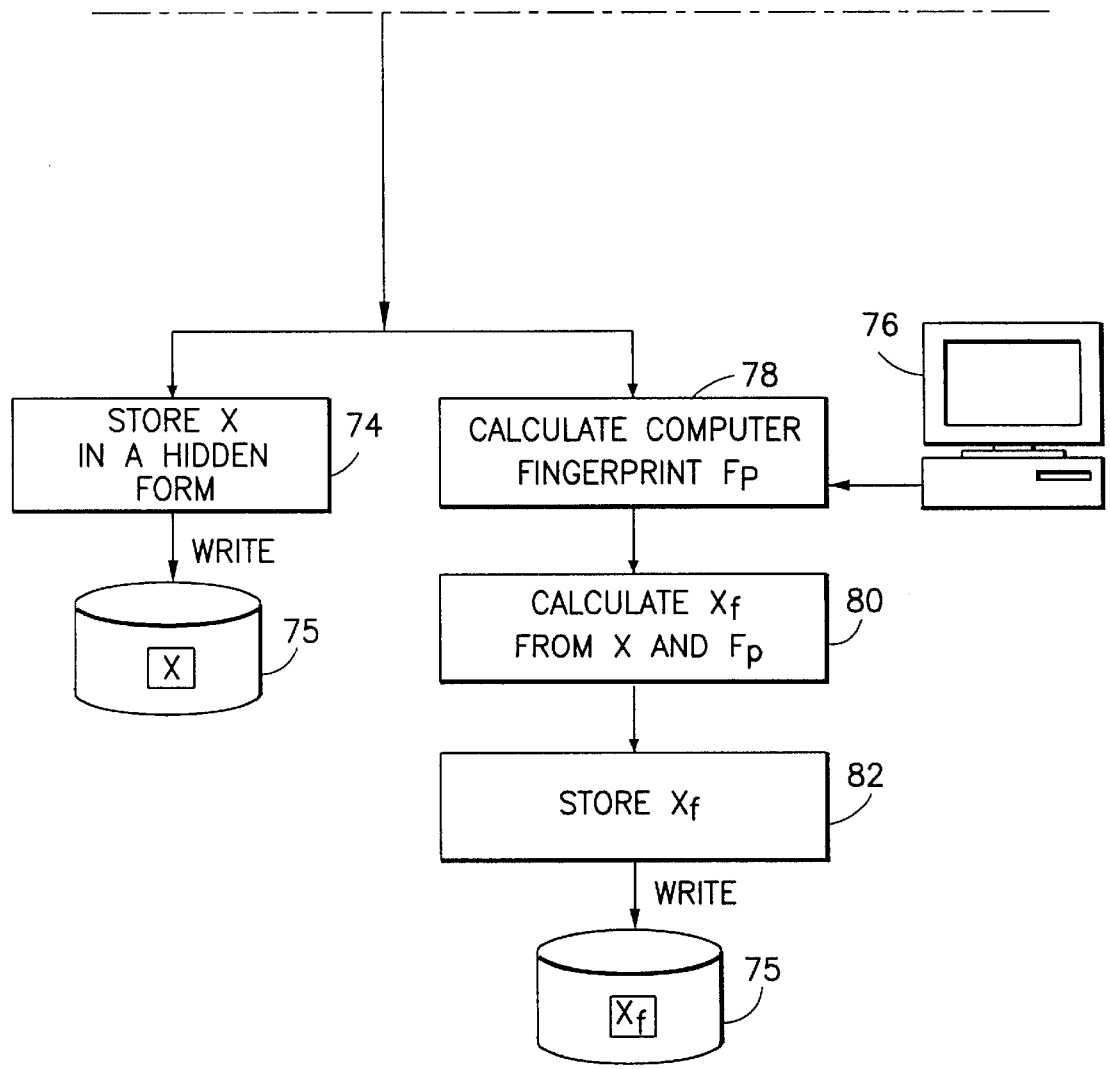
Figure 3A:
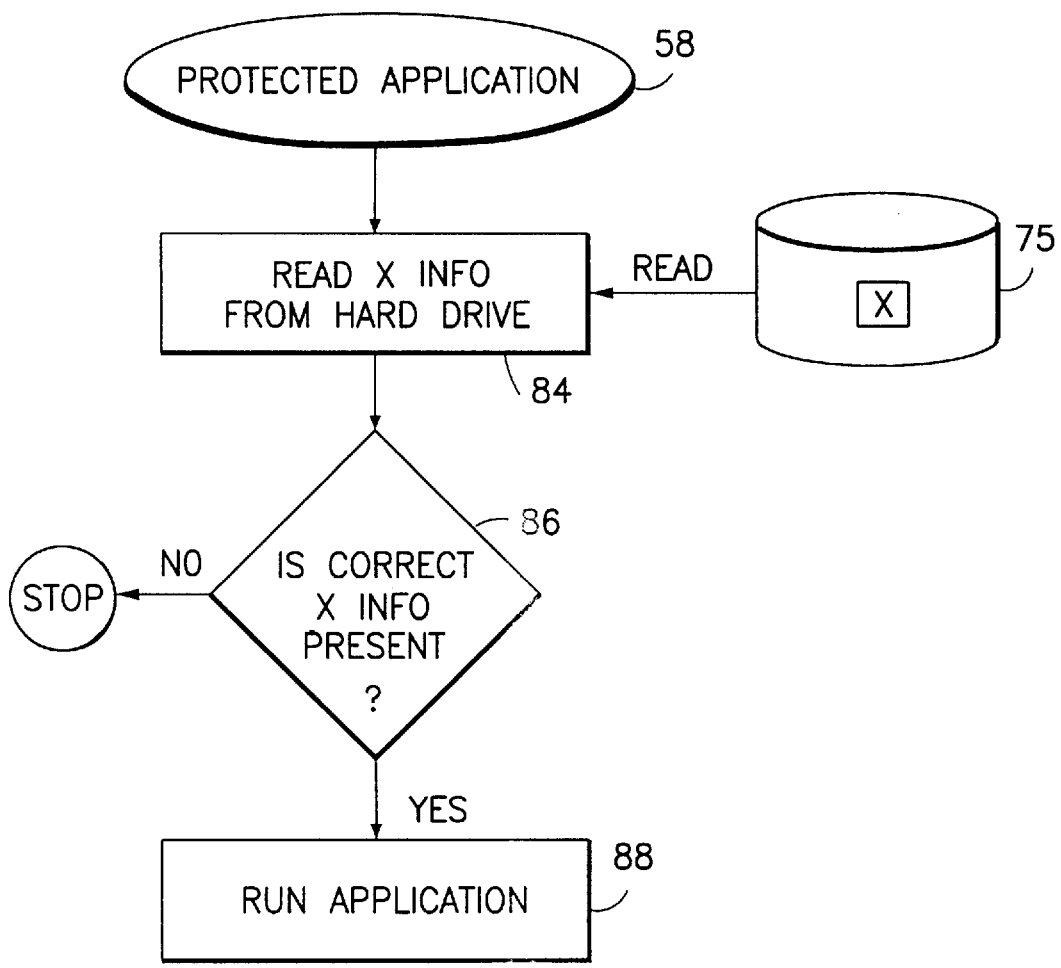
FIGS. 3A and B are flow diagrams illustrating the running of the protected program in accordance with the application installed in accordance with FIGS. 2A, B, and C.

FIG. 3A illustrates the running of a program protected in a simple manner using X which is stored in the hard disk 75 of the computer 76, as shown on the left side of FIG. 2C-2. The protected application 58 is run which reads the X information from the hard drive 75 in step 84. Then in step 86, X is checked to see if the correct X information is present. If not present, the program is stopped, and if present, runs the application as shown in block 88.

Figure 3B:
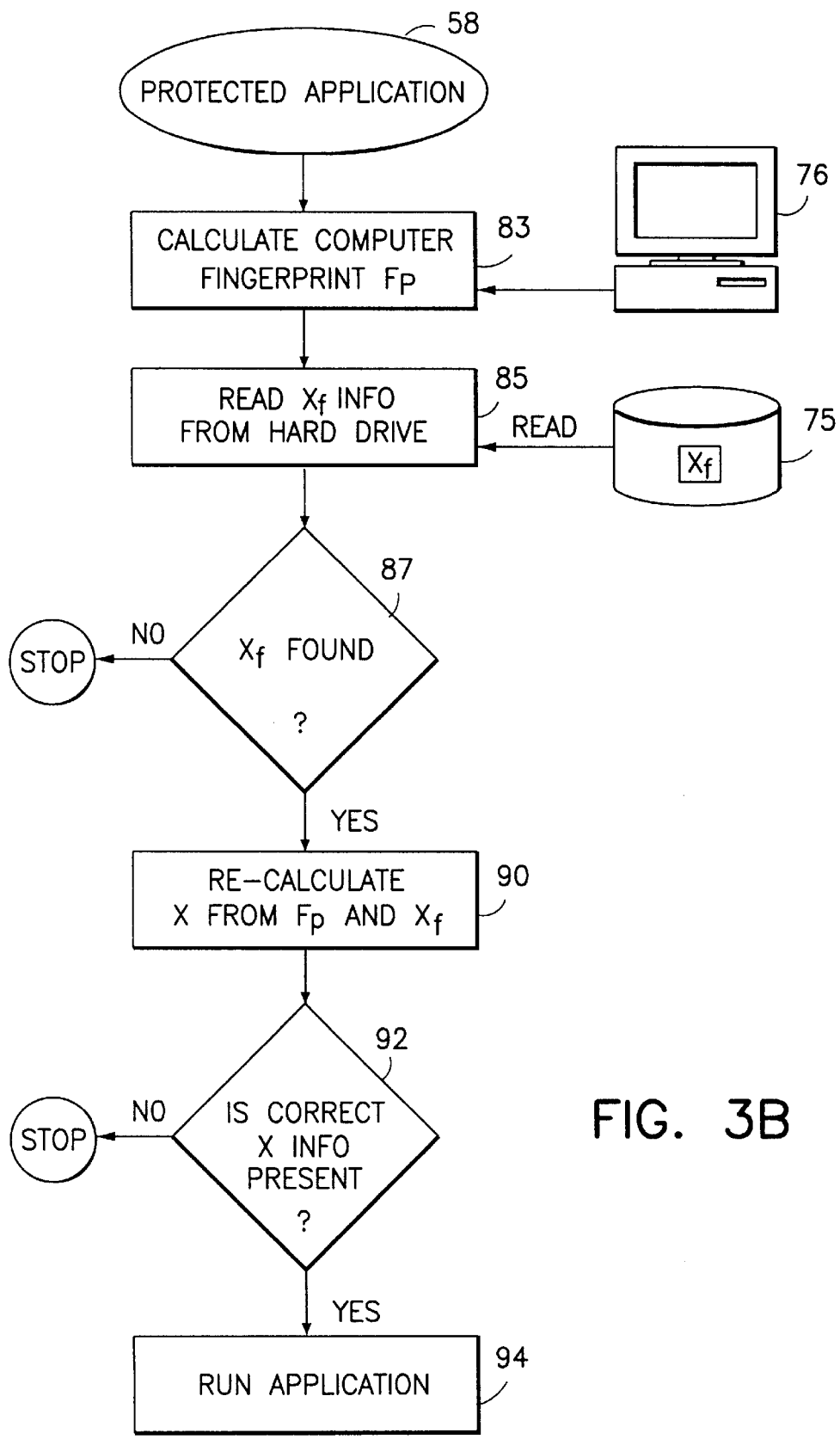

As seen in FIG. 3B, when the program 58 protected in the fingerprint approach shown on the right side of FIG. 2C-2 is run, it recalculates in step 83 the computer fingerprint $F_p$. The next step 85 comprises retrieving the stored $X_f$ value from the hard drive 75. If $X_f$ is found in step 87, the next step 90 recalculates X from $F_p$ and $X_f$. If X is found (92), the program runs (94); otherwise the program terminates when an error message is flashed on the computer 76.

Figure 4A:
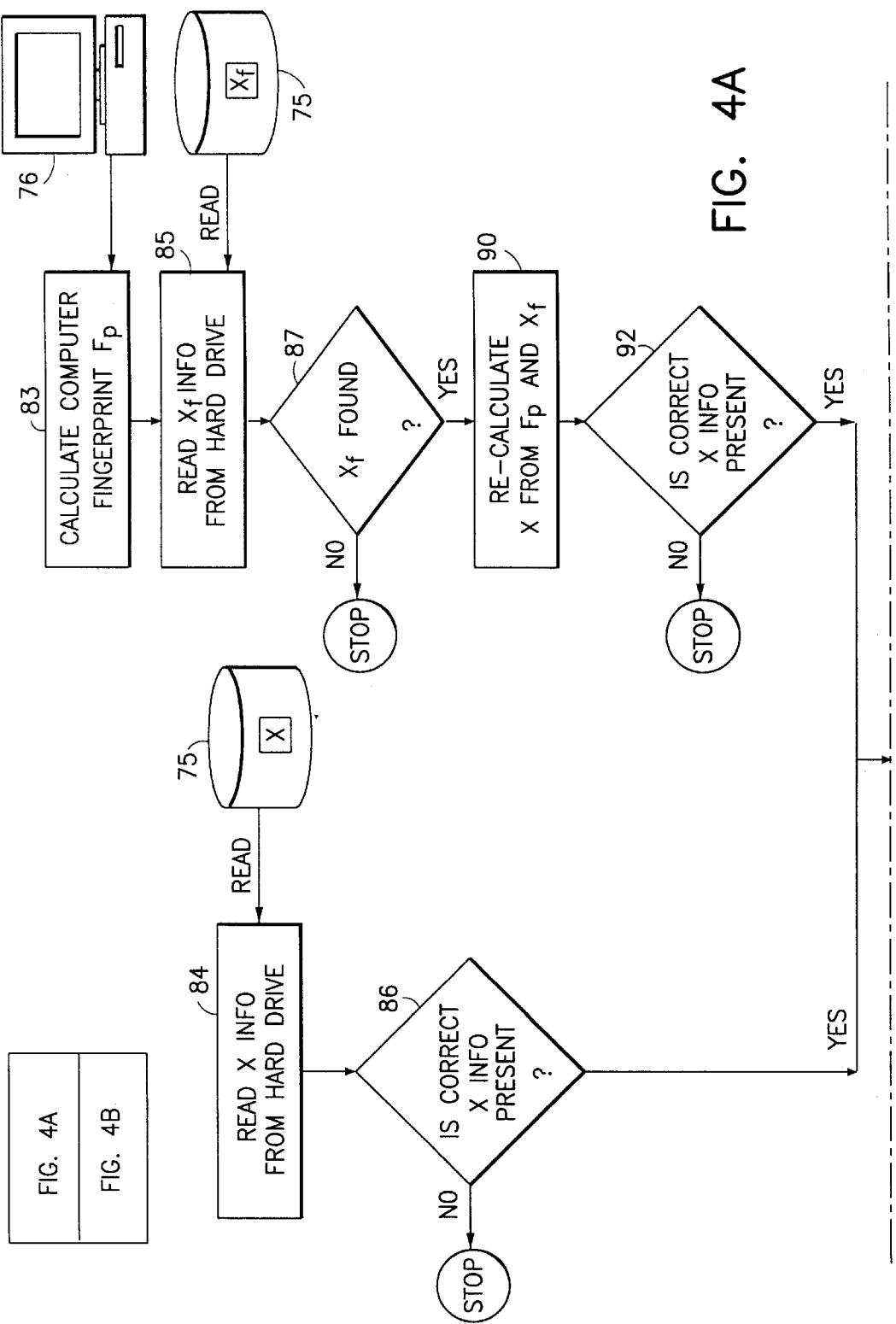

In order to move an installed program to another computer, the initial simple method using information X is the same a s shown on the left side of FIG. 4A, and the more secure "fingerprint" approach is initially the same as shown on the right side of FIG. 4A. To move the protected program, an uninstall program is run to provide the method illustrated on FIG. 4B. First in step 94, a check is made to see if the install HSED 100 is connected to the port of the user's computer 76. In the simple approach, step 86 checks to see if the correct X information is present, and if so, X information is written into the memory of the install HSED 100 and then in step 110 the X information is permanently and irreversibly destroyed on the hard drive 75 of computer 76. In the method where X is split into $K_1$ $X_2$, in step 96 $K_1$ is read and $X_2$ is calculated, and then $X_2$ is written into the memory of the HSED 100. If the fingerprint method is used, $X_f$ is erased from the hard drive 75 in step 110. Again, as an option to any of the multiple methods described, a counter 102 can be provided in HSED 100 which will include step 104, including the provision 106 to read the counter 102 and to increment the counter 102 in step 108 by writing back into the counter 102 in the HSED 100. If the counter is at zero, the incrementing step permits the reinstallation of the program using HSED 100.

The principle is the same in the software installation application and for the metering application, namely, a predetermined count is stored in memory of the HSED using one of the examples of a HSED discussed hereinbefore. There are many applications where it is desirable to measure, meter and/or monitor the amount of computer performed services. For one thing, it is a convenient method of billing the user for the amount of computer services which is used. By programming or otherwise writing into the memory of a HSED, a predetermined amount of computer services may be sold in advance. The HSED with a preprogrammed amount of computer service may be sold by selling and delivering the HSED to the end user. This method could be used in combination with a central fulfillment computer service center for billing, which could also provide a variety of computer services.

Figure 5:
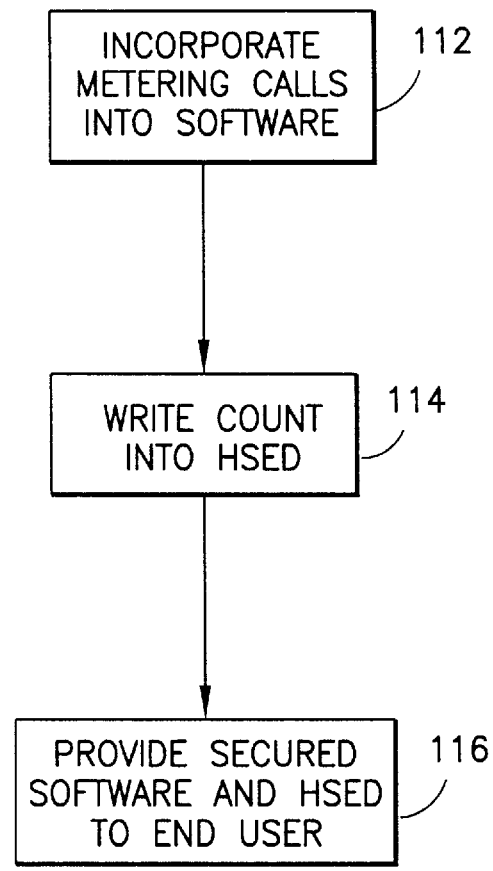
FIG. 5 is a flow diagram on the preparation of the software and HSED for a prepaid or a central billing type application.

Referring now to FIG. 5, to prepare for the metering method, the address or metering calls are incorporated into software on block 112. The HSED is prepared by writing or entering into the HSED the count value of the computer services to be performed in step 114. The addressing secured software is then provided to the end user in step 116, who pays for the amount of service or count entered into the HSED in step 114. FIG. 5 would be similar when used as a fulfillment center to which all services are dispensed and monitored.

Figure 6:
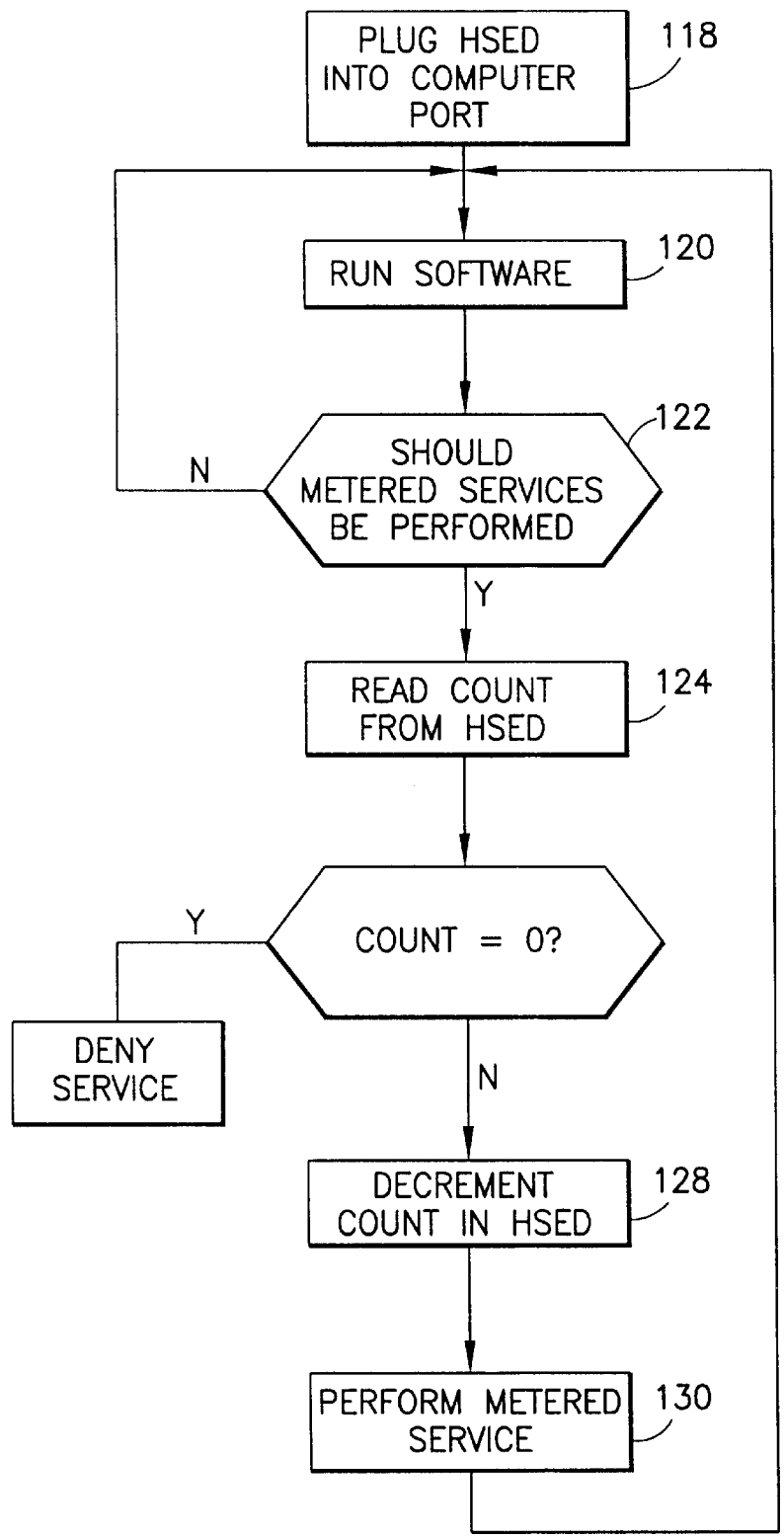
FIG. 6 is a flow diagram of a predetermined prepaid application.

In the non-centralized monitoring method, the HSED is plugged into a computer port illustrated in block 118 of FIG. 6. The software is run in block 120 to see if the HSED is plugged in and if the metered service is to be performed in block 122. The count is read from the HSED in 124 and if the count is zero in 126, service is denied. However, if the count is greater than zero, the count is decremented in 128 and the metered service is performed, as is depicted in 130.

Figure 7:
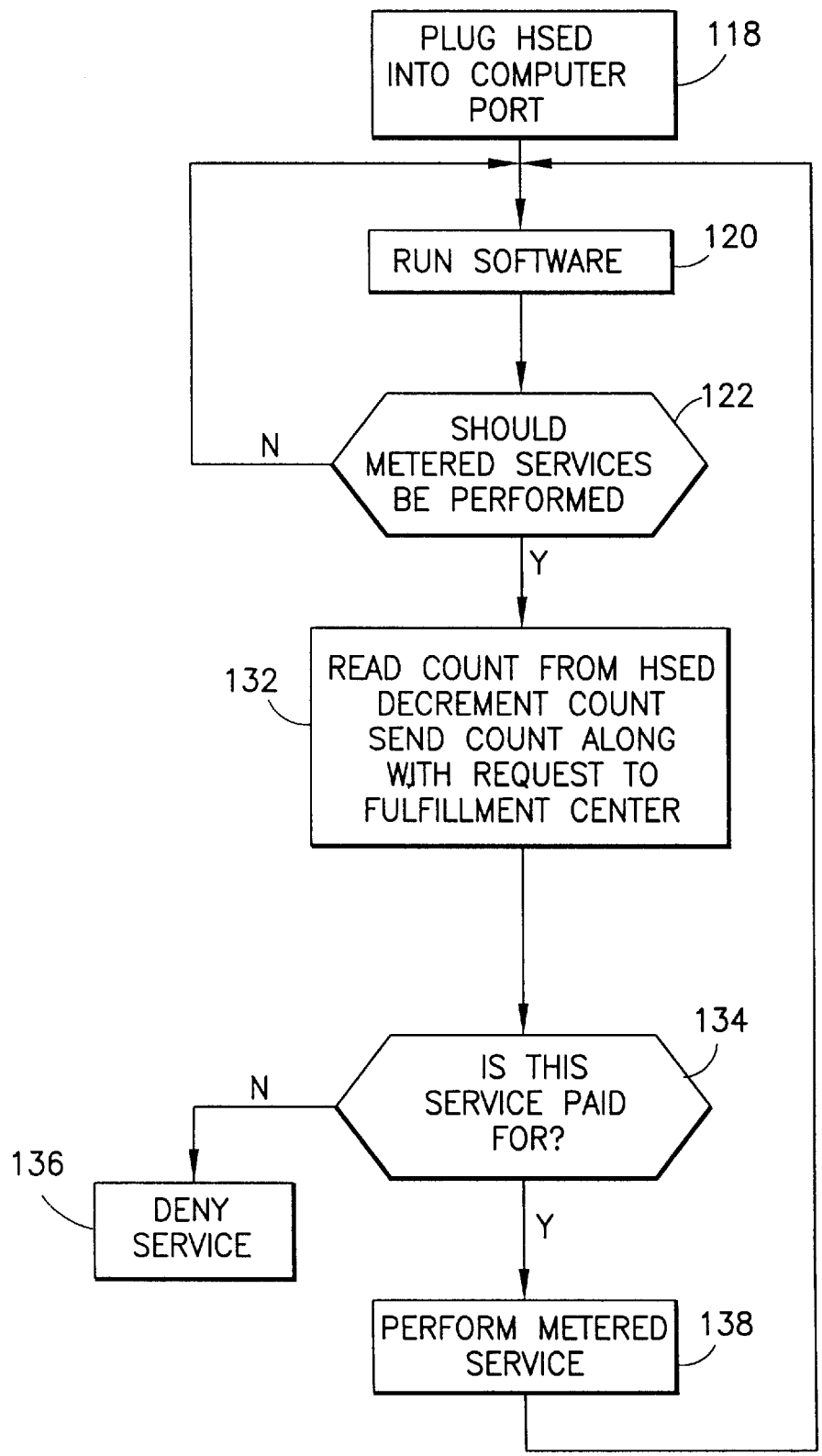
FIG. 7 is a flow diagram of a central monitoring billing application.

In the embodiment using a centralized fulfillment center illustrated by the flow chart in FIG. 7, steps 118, 120 and 122 are the same as in FIG. 6. If the HSED is in place, the count is read and decremented. Both the count and request for services are sent together to a fulfillment center in 132. If the service is not paid for in 134, the service is denied in 134. If paid for, the material service is performed in block 138.

Accordingly, what is effectively being accomplished by the addition of the counter in any of the embodiments is to regulate the number of installs and uninstalls or metered uses for a specific HSED. Instead of destroying the value stored in the install HSED, the HSED is provided with a counter which tells the install or metered program how many installations or performances are allowed. When the install or metered program is run, it checks that the counter is positive, i.e., is not at zero. If the counter is already at zero, the install or metered program terminates, providing an error message that all installs have been used. On each program installation or use, the install or performed program decrements the counter. When the counter is used with an install program, the uninstall program will increment the counter to add to the number of installations permitted with that HSED or to permit another installation using an otherwise spent HSED.

Accordingly, a new approach to software protection is provided by using an install HSED instead of an execution HSED. A variety of methods providing varying degrees of security are available depending on the desires; of the software developer. In many applications, once the program is installed, the HSED is spent and can be disposed of. Also in providing the protected program along with an install program and the associated HSED, the developer or seller of the program has no further contact with the user with respect to the security application which cuts communication time and expense as well as eliminating costly record keeping, e.g., passwords or keys for each program sold, customers' list, etc. Furthermore, the use of the metered HSED provides a convenient method of charging for the computer service performed based on a predetermined number of performances.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A method of protecting computer software on installation using an installation media containing an installation program and software to be installed and an installation hardware security electrical device (HSED) which must accompany the installation media supplied to the user comprising the steps of:

preparing an installation media with an installation program and the software to be installed, preparing an install HSED with predetermined secret installation data, providing the installation media along with the related HSED to the user, installing the install HSED in a computer port of the user's computer in which the program is to be installed, running the installation program from the installation media on the user's computer which checks for the presence of the install HSED, retrieving the secret installation data from the HSED, and entering the software to be installed from the installation media onto the hard drive of the user's computer if the proper install HSED is present; and changing the secret installation data from the HSED on the installation of the software onto the hard drive of the user's computer to limit the number of future installations of the same program using the same HSED.

2. The method as claimed in claim 1 wherein the step of preparing an installation media includes encrypting at least a portion of the software to be installed using a selected encryption key, $K_a$, the step of preparing said install HSED includes storing the encryption key $K_a$ in the install HSED and the step of retrieving the secret data from the install HSED includes retrieving $K_a$, destroying the secret installation data on the install HSED on the retrieval of the encryption key $K_a$ and decrypting the software to be installed in the user's computer on the user's hard drive.

3. The method as claimed in claim 1 including the step of storing the retrieved secret installation data (X) from the HSED in the hard drive of the user's computer in a format that cannot be used on another computer and destroying the predetermined secret installation data from the install HSED immediately following its retrieval from the HSED.

4. The method as claimed in claim 3 in which the step of preparing the install HSED includes representation of the secret installation data (X) in the HSED as a combination of two parts $K_1$ and $X_2$ where $K_1$ is a fixed, unalterable value and storing $K_1$ and $X_2$ into memory in the HSED, the step of retrieving the secret installation data (X) from the HSED includes combining $K_1$ and $X_2$ to obtain X.

5. The method as claimed in claim 3 including the step of preparing the fingerprint ($F_p$) of the user's computer and calculating a value ($X_f$) such that the combination of ($F_p$) and ($X_f$) results in (X) and storing ($X_f$) in the hard drive, running the protected software and recalculating the computer fingerprint ($F_p$), retrieving the stored ($X_f$) from the hard drive and combining $F_p$ and $X_f$ to obtain the required X value of data when, if found, allows the installed software to run otherwise terminating the running of the program from the installed software.

6. The method as claimed in claim 3 where the user wishes to move a program from one computer to another includes preparing an uninstalled program for retrieving the secret installation data X from the hard drive, checking for the presence of the install HSED, destroying the information on the hard drive and rewriting the secret installation data (X) into the install HSED, using the rewritten secret installation data (X) on the install HSED to move the program to another computer by moving the install HSED containing the rewritten secret installation data (X) to the other computer and again running the installation media on the other computer.

\* \* \* \* \*